July 21, 1964  W. L. LINDLEY  3,141,490
TIRE BUFFER SUPPORT
Filed Dec. 7, 1962  2 Sheets-Sheet 1
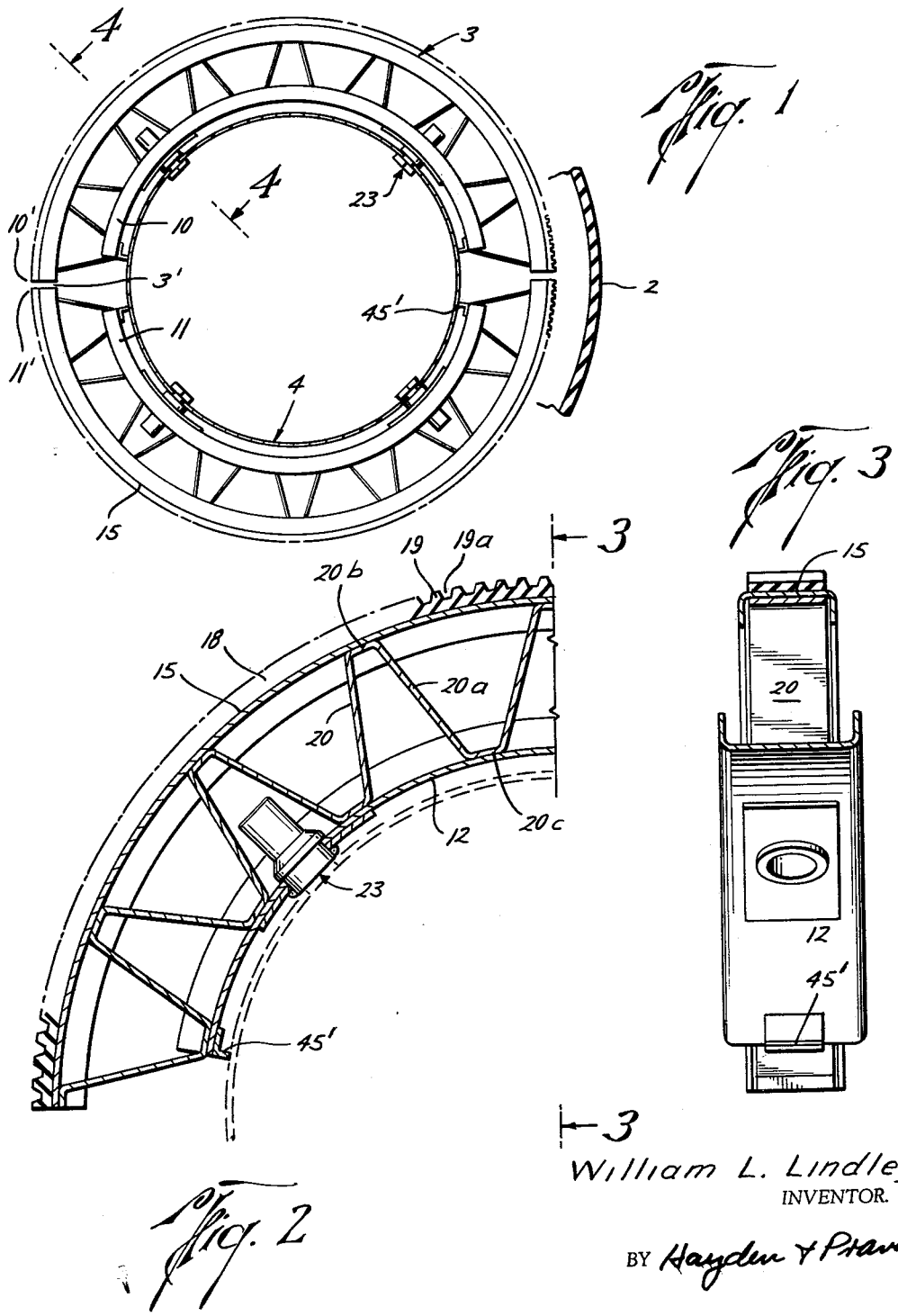
William L. Lindley
INVENTOR.
BY Hayden & Pravel
ATTORNEYS

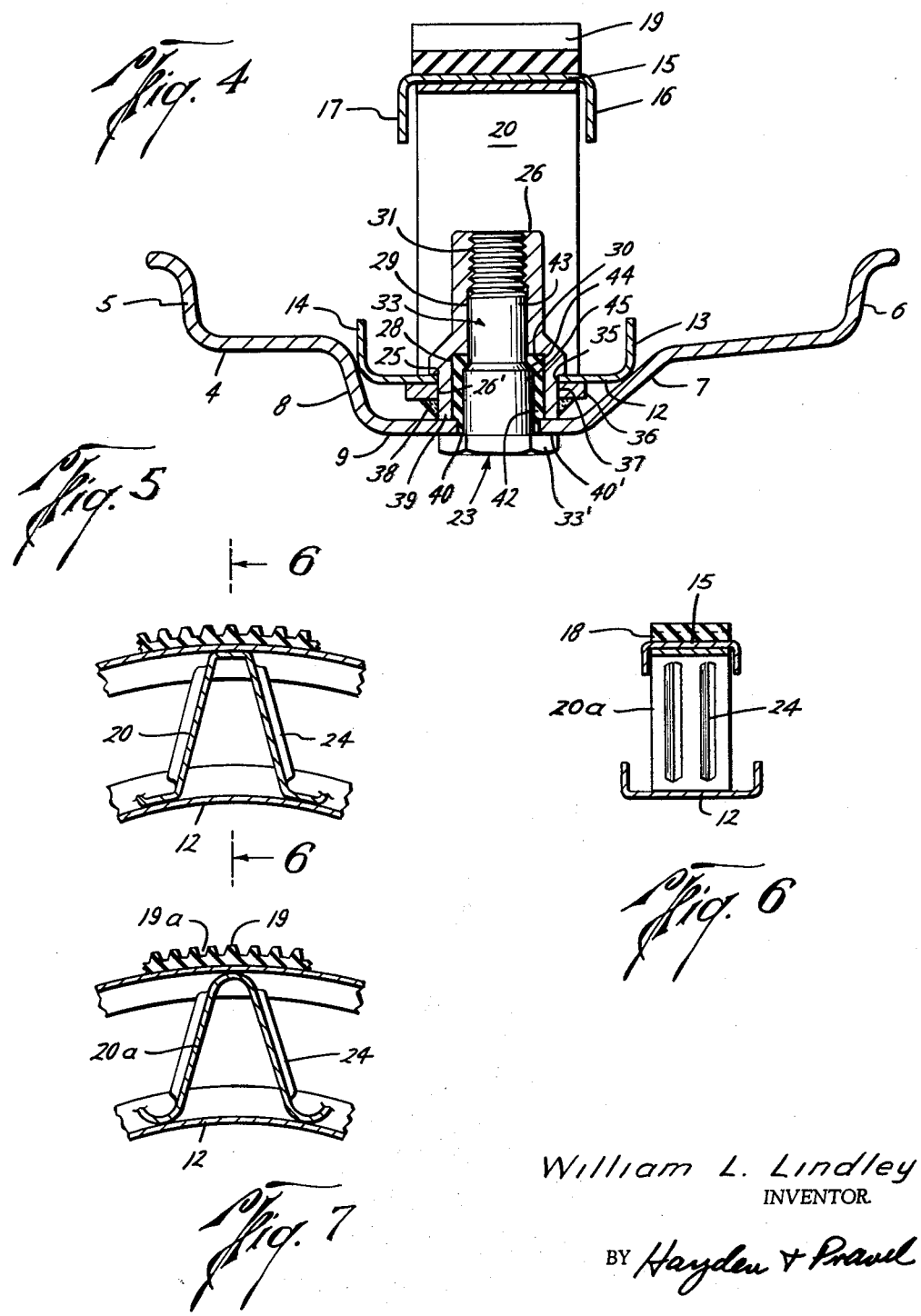

3,141,490
TIRE BUFFER SUPPORT
William L. Lindley, 711 Taft, Houston, Tex.
Filed Dec. 7, 1962, Ser. No. 242,986
1 Claim. (Cl. 152—158)

The present invention relates to a vehicle support assembly and particularly to a support assembly to be attached to the wheel rims of a vehicle carried on tubeless tires to support the vehicle when one of the tires becomes deflated.

Several attempts have been made to provide a device to support a vehicle carried on pneumatic tires when one of the tires blows out or otherwise becomes flat. When traveling even at a moderate speed, the course of a vehicle becomes difficult to control if a blowout occurs, and control of a vehicle becomes even more severe when the vehicle is traveling on crowded freeways at high speeds. Even if the vehicle is successfully brought to a stop, a dangerous traffic jam may result if the vehicle is not quickly moved to a place of safety to avoid impeding the flow of traffic. In either event, moving a vehicle on a deflated tire will greatly damage the tire and possibly the wheel rim on which it is mounted.

Thus, it is imperative that proper support be provided for a vehicle even when a tire is deflated so that it can be moved to a place of safety without damaging the tire or endangering the occupants of the vehicle and without interferring with the normal flow or movement of other vehicles.

The present invention provides an assembly to be placed inside of a tubeless tire and secured to the wheel rim on which the tire is mounted to support the vehicle and the tire in the event the tire should become deflated. The present invention assures driver control of the vehicle when a tire suddenly becomes deflated and allows the vehicle to continue to move at normal traveling speeds for great distances.

Further, the present invention will enable the vehicle to be supported and moved gradually out of the flow of traffic to a place of safety for repair of the deflated tire without causing further damage to the tire or the wheel rim on which the tire is mounted.

Another object of the present invention is to provide a vehicle support assembly of sufficiently simple construction to be capable of production economically in large quantities.

And yet another object of the present invention is to provide a lightweight support assembly of sufficient strength to withstand the initial impact of the weight of the vehicle on the assembly when the tire in which the assembly resides becomes deflated.

Another object of the present invention is to provide a flexible covering for the assembly to reduce the frictional wear upon the tire when engaged by the assembly. The flexible covering on the assembly also cushions the vibrations of the vehicle caused by the roughness of the surface over which the wheel rotates.

Still another object of the present invention is to provide a vehicle support assembly which can be inserted in a tubeless tire and easily and inexpensively secured to the wheel rim on which the tire is mounted with ordinary tools.

Another object of the present invention is to provide a vehicle support means which can be used repeatedly with different tires or can be easily and inexpensively removed and secured to other wheel rims.

Still another object of the present invention is to provide a vehicle support assembly of adequate strength and endurance to safely carry the vehicle sufficient distances at normal speeds to eliminate the necessity of having a spare tire and wheel in the vehicle.

And yet another object of the present invention is to provide an airtight sealing device for securing the vehicle support assembly to the wheel rim to prevent the escape of any air from the tubeless tire in which the assembly resides.

A still further object of the invention is to provide an assembly to be inserted in a tubeless tire which provides support laterally and vertically to the tire and vehicle when the tire deflates.

Other objects and advantages of the present invention will become readily apparent from a consideration of the following drawings and descriptions wherein:

FIG. 1 is a sectional view illustrating the preferred form of the present invention in position on a wheel rim and a fragmentary view of the tire;

FIG. 2 is an enlarged sectional view showing further details of the structure of the present invention;

FIG. 3 is a sectional view on line 3—3 of FIG. 2 illustrating additional details of the construction of the present invention;

FIG. 4 is an enlarged sectional view on line 4—4 of FIG. 1 illustrating the preferred means of securing the device on the wheel rim;

FIG. 5 is a partial sectional view showing another form of construction of the present invention;

FIG. 6 is a sectional view taken on line 6—6 of FIG. 5 illustrating further structural details of the present invention; and FIG. 7 is a partial sectional view showing another configuration of the construction of the present invention.

In FIG. 1 of the drawings, a tubeless type tire is indicated by the numeral 2 and is shown in relation to a conventional drop center type wheel rim 4 on which the tire 2 is mounted. The device of the present invention, indicated generally by the numeral 3, is also mounted on the wheel rim 4 which is illustrated in more detail in FIG. 4 of the drawings. The wheel rim 4 has erect annular edge flanges 5 and 6 which engage the tire 2 to support the tire when it is inflated. The wheel rim 4 also has depressed annular center flanges 7 and 8 which define the sides of the drop center portion 9 of the wheel rim.

The device of the present invention which is mounted on the wheel rim 4 between the wheel rim and the tire 2 to support the tire when it becomes deflated, is comprised of a plurality of arcuate sections denoted by the numerals 10 and 11 in the drawings. The arcuate sections 10 and 11 are illustrated in the drawings as being of semicircular configuration which is the preferred embodiment of the present invention; however, it can be appreciated that the device of the present invention may be comprised of a plurality of arcuate sections, each of which has an arc shorter than that of a semicircle, provided that the combined arc of the several sections extends substantially about the entire circumference of the wheel rim 4.

It will be noted that there is a slight open area or space 3' between the ends 10' and 11' of the arcuate members or sections 10 and 11 in the preferred form of the invention as illustrated in FIG. 1 of the drawings for ease of installation and manufacturing tolerance. It will be appreciated that this small opening or space 3' is not necessary to the invention and may be omitted in other forms thereof, if desired.

When the arcuate sections 10 and 11 are mounted on the wheel rim 4 illustrated in FIG. 1 of the drawings, the outer member 15 provides a substantially continuous surface circumferentially of the wheel rim 4 projecting radially beyond the erect annular flanges 5 and 6 of wheel rim 4 on which the tire is mounted to support the weight of the vehicle when the tire becomes deflated. Supporting the weight of the vehicle on the arcuate sections 10 and 11 when the tire 2 becomes deflated, prevents the cutting and tearing of the tire 2 by the erect annular flanges 5 and 6 as the wheel rim 4 continues to rotate with the tire 2 deflated.

The construction of the arcuate sections 10 and 11 is illustrated in more detail in FIG. 2 wherein 12 designates the inner member of each arcuate section, 15 designates the outer member of each section, 18 designates the outer surface or resilient cover which is former on the outer member 15, and 20 designates the nonradial support member extending between the inner member 12 and the outer member 15. The fastening means designated generally at 23 is illustrated in more detail in FIG. 4 and will be described more fully hereinafter.

The inner member 12 is positioned circumferentially of the wheel rim 4 and adjacent the depressed annular flanges 7 and 8 as will be described more fully hereinafter.

The outer member 15 is covered with a resilient material 18 such as rubber in which there may be formed radially extending projections 19 which are alternately spaced with grooves 19a in the surface of the resilient material provided to contact the tire 2 when it becomes deflated.

The projections 19 are of a resilient material adapted to flex on contact with the tire 2, thereby providing a cushion to absorb the shock of the impact of the weight of the vehicle on the tire 2 when it becomes deflated. The projections 19 also provide positive traction between the wheel rim 4 and the deflated tire. Further, when the tire 2 becomes deflated and engages the arcuate sections 10 and 11, the yielding surface provided by the resilient material 18 will inhibit the cutting or damaging of the tire by the weight of the vehicle thrust upon the tire 2 when it becomes deflated.

The resilient material 18 may be vulcanized or otherwise bonded to the outer member 15 to assure its remaining in position on the outer member 15 under the stresses of being rotated while supporting the weight of the vehicle. Annular flanges 16 and 17 are formed by bending the edges of the outer member 15 back toward the rim 4 on which the device of the invention 3 is mounted and out of the plane of the outer member 15. The annular flanges 16 and 17 will provide further protection for the tire 2 when it becomes engaged by the device of the invention 3 in the event the resilient covering 19 and the projections therein should become worn or detached from the outer member 15. The outer flanges 16 and 17 will also provide additional strength and rigidity to the outer periphery of the arcuate members 10 and 11.

The inner member 12 is wider than the outer member 15 to provide a stable base for the device of the invention 3 to support the tire 2 when it becomes deflated. More particularly, the annular flanges 13 and 14 of the inner member 12 are spaced more widely apart in the preferred embodiment of the invention than are the annular flanges 16 and 17 of the outer member 15, thus providing lateral support and increased stability for the outer member 15 of the device of the present invention 3. The annular flanges 13 and 14 are formed by bending the edges of the inner member 12 away from the wheel rim 4 on which the device of the invention is mounted. The annular flanges 13 and 14 are in spaced relation to each other to simultaneously engage the depressed annular sides 7 and 8, respectively, when the device 3 is secured in position extending circumferentially about the depressed annular portion 9 of the drop center type wheel rim 4. The annular flanges 13 and 14 engage the depressed annular sides 7 and 8 of the wheel rim 4 to provide lateral support to the device 3 as well as some compression loading of the wheel rim 4 at the points of contact between the annular flanges 13 and 14 and in depressed annular sides 7 and 8, respectively. It should be noted that the compression loading of the depressed annular sides 7 and 8 is not sufficient to spread the depressed annular sides 7 and 8 apart since most of the load is transmitted from the outer member 15 through projections 20 to the wheel rim 4 upon which the device is mounted.

The outer member 15 is supported circumferentially of the inner member 12 and is maintained in radial spaced relation thereto by the support member 20. In the preferred embodiment of the present invention as illustrated in FIG. 2 of the drawing, the support member 20 is a continuous member which extends circumferentially about the wheel rim 4 connecting alternately the inner member 12 and the outer member 15. The support member 20 includes support arms 20a which extend in nonradial directions connecting the inner member 12 and the outer member 15. As illustrated more fully in FIGS. 2 and 5, that portion of the support member 20 which contacts the outer member 15 is designated in FIG. 2 as 20b, and the area of contact between the support member 20 and the inner member 12 is designated in FIG. 2 as 20c. In a preferred embodiment of the present invention as illustrated in FIGS. 3 and 5 of the drawings, it will be noted that the contact portions 20b and 20c of the support member 20 extend laterally across the entire width of the support member 20. It will also be noted that the contact areas 20b and 20c extend slightly circumferentially about the wheel rim as illustrated in FIG. 2 of the drawings. The areas of contact 20b and 20c are uniform in size and configuration to provide uniform loading on the tire 2 throughout the circumference of the wheel rim 4 to inhibit damage to the tire 2 and to provide better control of the vehicle in the event the tire 2 becomes deflated. Of course, it can be appreciated that both the lateral and the circumferential extent of the areas of contact 20b and 20c may be varied without departing from the scope of the present invention as illustrated in FIG. 7 of the drawings.

Further, it will be noted in FIGS. 5–7 of the drawings that longitudinally extending ridges or projections 24 may be provided in the support arms 20a of the support member 20, thereby adding further rigidity and strength to the support arms 20a.

To install the arcuate members 10 and 11 on the wheel rim 4, the position for the holes 40 is determined by use of templet or other measuring means and the holes 40 are formed in the wheel rim 4. One side of the tire 2 is removed from the erect annular flanges 5 and 6 and the arcuate members 10 and 11 are inserted inside of the tire 2. The arcuate members 10 and 11 are then positioned adjacent the wheel rim 4 with the bores 28 and 29 and the openings 35 and 37 in alignment with the opening 40 to receive the bolt means 33 to secure the arcuate members 10 and 11 to the wheel rim 4. The alignment of the openings 35 and 37 in the arcuate members 10 and 11 with the opening 40 in the wheel rim 4 may be maintained by inserting either the bolt means 33 or other similar threaded device through the openings 40, 35, and 37. With the arcuate members 10 and 11 in alignment of the wheel rim 4, the tire 2 is properly mounted on the erect annular flanges 5 and 6 of the wheel rim 4. The tire 2 is slightly inflated to secure the bead of the tire to the annular flanges 5 and 6. The bolt means 33 is then tightened into the threaded portion of the receptacle 26 thereby securing the arcuate members 10 and 11 to the wheel rim 4. In the event other means were used to align the openings 35 and 37 in the arcuate members 10 and 11 with the opening 40 in the wheel rim, such aligning means or device is removed and the bolt means 33 is inserted through the aligned openings 40, 35, and 37 and tightly threaded into the receptacle 26 securing the arcuate members 10 and 11 to the wheel rim 4.

Turning now to the attaching means designated generally at the numeral 23 and illustrated in detail in FIG. 4 of the drawings, the numeral 26 indicates the receptacle for receiving the bolt means designated generally at 33, which is threadedly fitted therein as will be described in more detail hereinafter. The receptacle 26 has two cylindrical chambers, one of a larger diameter bore than the other. The large diameter bore is designated at numeral 28, and the small diameter bore is designated by numeral 29. Both bores 28 and 29 are formed about a common longitudinal axis, and an annular shoulder 30 is formed circumferentially about the end of a large diameter bore 28 adjacent the small diameter bore 29. The longitudinal half of the small diameter bore 29 adjacent the large diameter bore 28 has a smooth internal surface and the balance of the small diameter bore has threads formed in its surface to receive the bolt means 33 as will be described more fully hereinafter. An opening 35 is provided in the inner member 12 to receive the receptacle housing 26. A reinforcing plate 36 is positioned adjacent the inner member 12 between the inner member 12 and the wheel rim 4 for providing additional strength and support to the inner member 12 circumferentially about the perimeter of the opening 35 in the member 12. Opening 37 is provided in the reinforcing member 36, which opening is of the same size as the opening 35 in the member 12 and which opening 37 is in alignment with the opening in 35. The openings 35 and 37 are of substantially the same size and configuration as the portion 26' of the receptacle or housing 26 so that the external portion 26' will slidably fit through the openings 35 and 37. An annular shoulder 25 is formed externally of the receptacle 26 adjacent the external portion 26' and abuts the inner member 12 about the opening 35 therein to cooperate to secure the receptacle 26 to the inner member 12, as will be described more fully herein.

The receptacle 26 is slidably fitted through the opening 35 in the inner member 12 and the opening 37 in the reinforcing plate 36 until the annular shoulder 25 abuts the inner member 12 about the periphery of the opening 35. The reinforcing plate 36 is then attached by welding or other suitable means designated generally by the numeral 38 to the receptacle housing 26 to form a unitary construction of the inner member 12, the reinforcing plate 36, and the receptacle housing 26.

The opening 40 is provided in the depressed area 9 of the drop center type wheel rim 4 for receiving the bolt means 33.

The base 39 of the receptacle 26 engages the depressed portion 9 of the drop center type wheel rim 4 and is positioned so that the large diameter 28 of the receptacle 26 is aligned with the opening 40 in the wheel rim 4 to receive the bolt means 33 which passes through the opening 40 into the large diameter bore 28 and the small diameter bore 29 of the receptacle 26. A cylindrical sleeve of gasket or seal material 42 is slidably fitted within the large diameter bore 28 of the receptacle 26 with one end of the sleeve 42 abutting the annular shoulder 30 of the receptacle 26.

The bolt means 33 is comprised of a large diameter portion 45 and a small diameter portion 43 which are joined together by a tapered portion 44. Approximately half of the longitudinal extent of the small diameter portion 43 of the bolt means 33 has a smooth surface; the balance of the small diameter portion of the bolt means 33 is threaded as shown in FIG. 4 of the drawings, to be received by the threaded portion 31 of the receptacle housing 26. It should be noted that the threaded portion of the bolt means 33 has a smaller diameter than the large diameter bore 28 of the receptacle 26 in which the seal or gasket material 42 is contained. This allows the threaded portion of the bolt means 33 to be passed completely through the longitudinal extent of the seal material 42 before becoming engaged with the threads 31 formed in the receptacle 26 thereby preventing the cutting or scratching of the seal or gasket material 42. As scratches or cuts in the gasket or seal material adjacent the surface of the bolt means 33 could form passages through which air could leak from the inflated tire 2, the precaution against cutting or scratching the surface of the gasket or seal material is taken. Also by having the longitudinal extent of the smooth surface portion of the bolt means 33 as great as or greater than the longitudinal extent of the large diameter bore 28 in which the seal or gasket material 42 is contained, none of the threaded portion of the bolt means 33 is adjacent the seal or gasket material 42 when the bolt 33 is rotated to be threaded into the threads 31 of the receptacle 26.

The internal diameter of the gasket or seal material sleeve 42 is slightly less than the diameter of the large diameter portion 45 of the bolt means 33. Thus, when the bolt 33 is tightened in the receptacle 26, a part of the gasket or seal material 42 is extruded out of the large diameter bore 28 into the annular opening between the bolt means 33 and the hole 40 in the drop center type wheel rim 4. A portion of the gasket or seal material may be extruded between the head 33' of the bolt 33 and the surface 40' of the wheel rim 4 circumferentially adjacent the hole 40 through which the bolt 33 fits. The extrusion of the gasket or seal material circumferentially of the bolt 33 serves to form an airtight seal completely around the bolt means at the opening 40 in wheel rim 9 as well as about the large diameter portion 45 of the bolt means 33 in the large diameter bore 28 of the receptacle 26.

The annular shoulder 30 formed about the end of the large diameter bore 28 and at its juncture with the small diameter bore 29 in the receptacle 26 functions as a stop to prevent any longitudinal travel of the gasket or seal material sleeve 42 as the bolt 33 is being tightened in the receptacle 26, thus forcing extrusion of the seal or gasket material 42 through the opening 40. There is a tapered portion 44 of the bolt 33 extending between the large diameter portion 45 and the small diameter portion 43 which tends to compress the seal material 42 against the shoulder 30 and thereby force the extrusion of the material into the opening 40.

It should be further pointed out that the internal diameter of the seal material 42 prior to being extruded by the tightening of the bolt 33 is of such small diameter that the large diameter portion 45 of the bolt 33 must be moistened or otherwise lubricated in order for the bolt 33 to be tightened to the point where the head 33' of the bolt 33 seats securely on the surface 40' of the depressed portion of the wheel rim 9 circumferentially adjacent the opening therein through which the bolt 33 passes.

The tightening of the bolt 33 in the receptacle 26 in addition to extruding the seal or gasket material 42 to form an airtight seal about the bolt 33, also provides some compression loading circumferentially of the opening 40 in the area designated 40' which is circumferentially adjacent the opening 40.

It will be noted that in the preferred embodiment of the invention as illustrated in FIG. 1 of the drawings, there are four locations evenly spaced circumferentially about the wheel rim at which the securing means 23 are located. This provides four areas of compression loading evenly distributed about the circumference of the depressed portion 9 of the wheel rim 4 in addition to the slight compression loading extending circumferentially of the wheel rim 4 on the depressed annular sides 7 and 8 by the annular flanges 13 and 14 of the inner member 12. It will also be noticed that the bolt means 33 are evenly spaced about the circumference of the wheel rim 4 so that each bolt means has another bolt means diametrically opposed to it to provide an even balance for the wheel rim.

There are also supplied additional support means 45' at each end of the inner support member 12. The support means 45' may be welded or otherwise suitably attached to the inner member 12 and is arranged to engage the depressed portion 9 of the drop center type wheel rim 4.

To further amplify and describe the device of the present invention, the inner member 12 and the outer member 15 are maintained in radial spaced relation to each other by the nonradially extending support member 20 which is connected by welding or other suitable means alternately to the outer member 15 and the inner member 12 throughout the arc of the arcuate sections 10 and 11.

The outer member 15 is covered by a resilient material 18 in which are formed projections or ridges 19 which will flex upon engagement with the tire 2 when it becomes deflated, thereby protecting the tire from damage by the wheel rim 4. The inner member 12 engages the sides 7 and 8 of the drop center type portion 9 of the drop center type wheel rim 4 throughout the entire circumference of the inner member 12. The inner member 12 is also provided with openings 40 through which the bolt means 33 extend to engage the threaded portion of the receptacle 26. The large diameter bore 28 of the receptacle 26 is lined circumferentially with gasket or seal material 42, a portion of which is extruded by the insertion of the large diameter portion 45 of the bolt means 33 into the opening in the cylindrical sleeve of seal or gasket material 42, which opening is of a smaller diameter than that of the large diameter portion 45 of the bolt means 33. The seal or gasket material 42 is extruded into the opening 40 circumferentially of the bolt means 33 to provide an airtight seal between the bolt 33 and the receptacle 26 to prevent the leakage of any air from the tire 2 mounted on the drop center type wheel rim 4 through the opening 40 in the wheel rim 4 through which the bolt 33 extends.

Broadly, the present invention relates to an inexpensive and easily fabricated vehicle support device to be mounted in a tubeless tire on the wheel rim on which the tire is mounted to support the vehicle when the tire becomes deflated and to the means for securing said device to the wheel rim.

What is claimed is:

A support assembly adapted to be inserted inside a tubeless tire and attached to a drop center type wheel rim on which the tubeless tire is mounted including a plurality of arcuate sections extending circumferentially about the drop center portion of the wheel rim, each section having concentrically arranged outer and inner members maintained in fixed spaced relation to each other by load-bearing nonradially laterally extending members secured therebetween, said outer member being covered with resilient material in which a plurality of radially extending projections are formed, said projections adapted to engage the tire upon deflation thereof, said projections flexing when engaged with said tire to inhibit damage thereto, said inner member adapted to engage the inner annular sides of the depressed portion of the wheel rim for lateral support, means to support said sections in spaced relation to said wheel rim and means for securing said sections to said wheel rim, said means including a bolt means having a large diameter portion, a small diameter portion, thread means on less than half of said small diameter portion and a tapered portion connecting said large diameter portion and said small diameter portion, a receptacle for receiving said bolt means including a large diameter bore of greater longitudinal extent than the large diameter portion of said bolt means, a small diameter bore threaded to receive the threaded portion of said bolt means, a shoulder means formed at the juncture of said large diameter bore and said small diameter bore, a seal means formed circumferentially of the large diameter bore and abutting said shoulder means, said seal means having a smaller internal diameter than the large diameter portion of said bolt means whereby the seal is extruded into the opening in said wheel rim to provide an airtight seal between said bolt means and said wheel rim.

References Cited in the file of this patent
UNITED STATES PATENTS

| | | |
|---|---|---|
| 1,066,784 | Barrett | July 8, 1913 |
| 1,427,995 | Allen | Sept. 5, 1922 |
| 1,447,365 | Walther | Mar. 6, 1923 |
| 2,262,780 | Sherwood | Nov. 18, 1941 |
| 2,986,189 | Lindley | May 30, 1961 |
| 2,989,108 | Gore | June 20, 1961 |